United States Patent
Oomura et al.

(10) Patent No.: US 7,913,665 B2
(45) Date of Patent: Mar. 29, 2011

(54) INTERNAL COMBUSTION ENGINE

(75) Inventors: Hidekazu Oomura, Hekinan (JP); Yukio Tomiita, Anjo (JP); Yoshinori Yamashita, Kariya (JP); Koichi Sugiyama, Nagoya (JP); Hideaki Ichihara, Obu (JP); Yoshihiro Nakase, Okazaki (JP); Takanori Suzuki, Nishio (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 312 days.

(21) Appl. No.: 12/238,802

(22) Filed: Sep. 26, 2008

(65) Prior Publication Data

US 2009/0084339 A1 Apr. 2, 2009

(30) Foreign Application Priority Data

Sep. 28, 2007 (JP) ................................ 2007-253928

(51) Int. Cl.
*F02B 15/00* (2006.01)
(52) U.S. Cl. .................. 123/308; 123/432; 123/470
(58) Field of Classification Search .................. 123/308, 123/432, 470, 490
See application file for complete search history.

(56) References Cited

U.S. PATENT DOCUMENTS

| | | | |
|---|---|---|---|
| 5,050,557 A | 9/1991 | Ishida et al. | |
| 5,680,845 A * | 10/1997 | Peng | 123/470 |
| 5,829,408 A | 11/1998 | Yamaguchi et al. | |
| 6,055,948 A | 5/2000 | Shiraishi et al. | |
| 6,308,684 B1 | 10/2001 | Konishi | |
| 6,722,344 B2 * | 4/2004 | Ashida et al. | 123/432 |
| 6,742,495 B2 * | 6/2004 | Ashida et al. | 123/310 |
| 2003/0084877 A1* | 5/2003 | Kabat et al. | 123/432 |
| 2004/0164187 A1 | 8/2004 | Kihara et al. | |
| 2006/0144369 A1 | 7/2006 | Takahashi et al. | |
| 2007/0034192 A1* | 2/2007 | Kamio et al. | 123/478 |
| 2007/0215110 A1* | 9/2007 | Stein et al. | 123/431 |

FOREIGN PATENT DOCUMENTS

| | | |
|---|---|---|
| JP | Y2-4-13415 | 3/1992 |
| JP | Y2-6-031174 | 8/1994 |
| JP | 06-249109 | 9/1994 |
| JP | 06-288330 | 10/1994 |
| JP | 08-218986 | 8/1996 |
| JP | 10-073061 | 3/1998 |
| JP | 2001-193553 | 7/2001 |
| JP | 2003-013741 | 1/2003 |
| JP | 2003-262174 | 9/2003 |

(Continued)

OTHER PUBLICATIONS

Japanese Office Action dated Jan. 12, 2010, issued in corresponding Japanese Application No. 2007-253928, with English translation.

(Continued)

*Primary Examiner* — Erick Solis
(74) *Attorney, Agent, or Firm* — Nixon & Vanderhye PC

(57) ABSTRACT

A cylinder of an internal combustion engine is communicated with intake ports. Each of intake valves and each of fuel injection valves are provided to a corresponding one of the intake ports to inject fuel into a combustion chamber through a curved portion and an opening of the corresponding intake port. An injection axis of each fuel injection valve intersects with a surface of the corresponding intake valve placed in a close position at an intersecting point that is located on an upstream side of a central axis of the corresponding intake valve.

12 Claims, 5 Drawing Sheets

FOREIGN PATENT DOCUMENTS

| | | |
|---|---|---|
| JP | 2003-262175 | 9/2003 |
| JP | 2004-353463 | 12/2004 |
| JP | 2005/098231 | 4/2005 |
| JP | 3690824 | 6/2005 |
| JP | 2005-220885 | 8/2005 |
| JP | 2006-125333 | 5/2006 |
| JP | 2006170020 A * | 6/2006 |
| JP | 2007-262995 | 10/2007 |

OTHER PUBLICATIONS

U.S. Appl. No. 12/064,968 of Timisaka et al., filed Mar. 27, 2007.
Japanese Office Action dated Aug. 18, 2009, issued in corresponding Japanese Application No. 2007-253928, with English translation.

* cited by examiner ly, in a case where the combustion chamber of the cylinder is communicated with a plurality of intake ports, the intake ports are branched from an intake passage at a branching point. In this case, when fuel is injected from a fuel injection valve located on an upstream side of the branching point, the fuel may adhere to a partition wall, which partitions between the intake ports at the branching point. The fuel, which adheres to the partition wall, flows into the combustion chamber without being atomized. The fuel, which is not atomized, does not undergo complete combustion, so that unburnt hydrocarbons (HCs) are exhausted from the internal combustion engine. In order to address the above disadvantage, it has been studied to place a fuel injection valve in each intake port (i.e., two fuel injection valves in the two intake ports, respectively, in the case where the two intake ports are communicated with the combustion chamber) in a manner that avoids adhesion of the fuel to the partition wall at the branching point to limit direct contact of the fuel injected from each fuel injection valve to the partition wall.

INTERNAL COMBUSTION ENGINE

CROSS REFERENCE TO RELATED APPLICATION

This application is based on and incorporates herein by reference Japanese Patent Application No. 2007-253928 filed on Sep. 28, 2007.

BACKGROUND OF THE INVENTION

1. Field of the Invention

The present invention relates to an internal combustion engine, in which fuel injected from a fuel injection valve is supplied into a combustion chamber through an intake port.

2. Description of Related Art

In a known internal combustion engine of a port-injection type, fuel is injected from a fuel injection valve into an intake port, which opens to a combustion chamber of a cylinder, to supply the fuel through the intake port. For example, Japanese Unexamined Patent Publication No. 2004-353463, Japanese Unexamined Patent Publication No. 2003-262175, Japanese Unexamined Patent Publication No. H07-133752 (corresponding to U.S. Pat. No. 5,829,408), and Japanese Unexamined Patent Publication No. 2006-125333 disclose structures and control apparatuses of such an internal combustion engine.

Normally, in a case where the combustion chamber of the cylinder is communicated with a plurality of intake ports, the intake ports are branched from an intake passage at a branching point. In this case, when fuel is injected from a fuel injection valve located on an upstream side of the branching point, the fuel may adhere to a partition wall, which partitions between the intake ports at the branching point. The fuel, which adheres to the partition wall, flows into the combustion chamber without being atomized. The fuel, which is not atomized, does not undergo complete combustion, so that unburnt hydrocarbons (HCs) are exhausted from the internal combustion engine. In order to address the above disadvantage, it has been studied to place a fuel injection valve in each intake port (i.e., two fuel injection valves in the two intake ports, respectively, in the case where the two intake ports are communicated with the combustion chamber) in a manner that avoids adhesion of the fuel to the partition wall at the branching point to limit direct contact of the fuel injected from each fuel injection valve to the partition wall.

However, it has been found that even in the case where the fuel injection valves are provided to the intake ports, respectively a certain amount of fuel may still adhere to the inner wall of the intake port located on a downstream side of the branching point. Even in this case where the fuel adheres to the inner wall of the intake port on the downstream side of the branching point, the adhered fuel flows into the combustion chamber without being atomized and is thereby exhausted as unburnt hydrocarbons from the internal combustion engine. Therefore, even when the fuel injection valves are provided to the intake ports, respectively, there may still exist the phenomenon of the increased content of the hydrocarbons in the exhaust gas and the deteriorated fuel consumption.

Furthermore, the intake port is normally directed toward the combustion chamber to have an air flow direction, which is tilted relative to an axial direction of the cylinder. The intake port may be curved to direct the air flow direction toward the central axis of the cylinder at a location adjacent to the opening of the combustion chamber. It has been found that the fuel tends to adhere to the inner wall surface of this curved portion.

SUMMARY OF THE INVENTION

The present invention addresses the above disadvantage. According to the present invention, there is provided an internal combustion engine, which includes a cylinder, a plurality of intake ports, a plurality of intake valves and a plurality of fuel injection valves. The cylinder receives a piston and defines a combustion chamber. Each intake port conducts intake air and has an opening and a curved portion. The opening opens to the combustion chamber and defines a valve seat. The curved portion is located adjacent to the opening on an upstream side of the opening. Each intake valve is provided to a corresponding one of the plurality of intake ports. Each intake valve is seatable against the valve seat of the opening to close the opening in a close position thereof and is liftable from the valve seat of the opening to open the opening in an open position thereof. Each fuel injection valve is provided to a corresponding one of the plurality of intake ports to inject and thereby to supply fuel into the combustion chamber along the intake air through the curved portion and the opening of the corresponding intake port. An injection axis of each fuel injection valve intersects with a surface of the corresponding intake valve placed in the close position at an intersecting point that is located on an upstream side of a central axis of the corresponding intake valve. The curved portion of each intake port includes a concavely curved inner peripheral wall surface, which is located on a downstream side of the central axis of the corresponding intake valve.

DETAILED DESCRIPTION OF THE INVENTION

An internal combustion engine according to an embodiment of the present invention will be described with reference to FIGS. 1 to 4.

Figure 1:
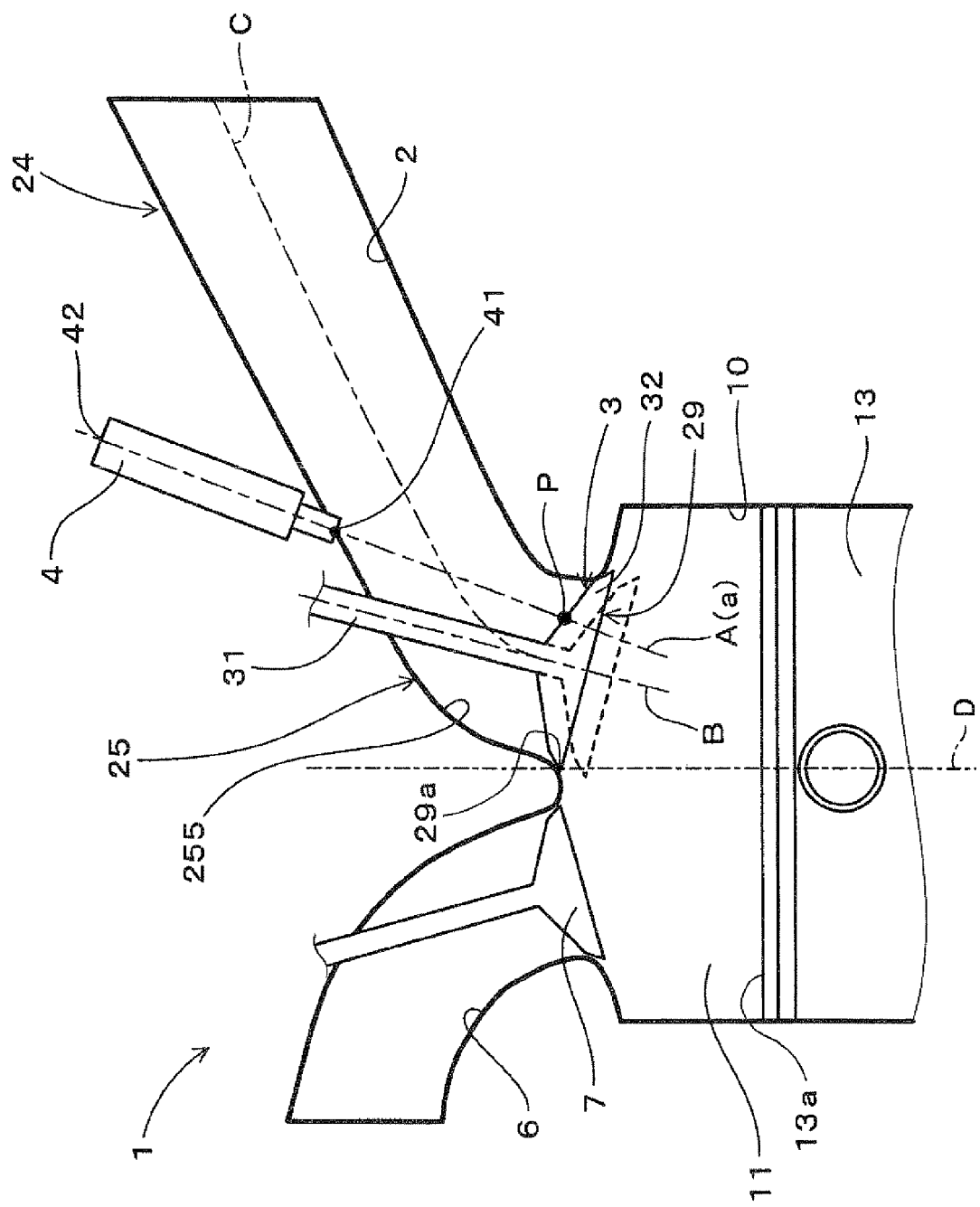
FIG. 1 is a schematic view showing a positional relationship of a central axis of an intake port, an injection axis of a fuel injection valve, and an intake valve according to an embodiment of the present invention.

With reference to FIG. 1, the internal combustion engine 1 of the present embodiment includes a plurality of intake ports 2, a plurality of intake valves 3 and a plurality of fuel injection valves 4. The intake ports 2 open to a combustion chamber 11 of a corresponding cylinder 10, which receives a piston 13 having a top surface 13a that faces the combustion chamber 11. The intake valves 3 are driven to open and close the intake ports 2, respectively. The fuel injection valves 4 are provided to the intake ports 2, respectively. Fuel, which is injected from, i.e., is sprayed from each fuel injection valve 4, is supplied to the combustion chamber 11 through a curved portion 25 of the corresponding intake port 2. The curved portion 25 is located adjacent to an opening 29 of the intake port 2 on an upstream side of the opening 29 and has a curved inner peripheral wall surface (concavely curved inner peripheral wall surface) 255. The opening 29 defines a valve seat 29a. A valve head 32 of the corresponding intake valve 3 is seatable against the valve seat 29a to close the opening 29 in a close position thereof and is liftable from the valve seat 29a to open the opening 29 in an open position thereof.

The fuel injection valve 4 is placed as follows. With reference to FIG. 1, an intersecting point P, at which an injection axis A of the fuel injection valve 4 intersects with a surface of the intake vale 3 placed in the close position for closing the opening 29, is located on an upstream side (the right side in FIG. 1) of a central axis B of the intake valve 3 while the curved inner peripheral wall surface 255 is located on a downstream side (the left side in FIG. 1) of the central axis B of the intake valve 3. More specifically, the intersecting point P is located outward (rightward in FIG. 1) of the central axis B of the intake valve 3 in a radial direction of the cylinder 10 when the fuel injection valve 4, the intake valve 3, the intake port 2 and the cylinder 10 are viewed from a direction, which is perpendicular to an imaginary plane (a plane of the sheet of FIG. 1) that includes a central axis C of the intake port 2. Furthermore, the curved inner peripheral wall surface 255 is located inward (leftward in FIG. 1) of the central axis B of the intake valve 3 in the radial direction of the cylinder 10 when the fuel injection valve 4, the intake valve 3, the intake port 2 and the cylinder 10 are viewed from the direction, which is perpendicular to the imaginary plane. Here, the injection axis A of the fuel injection valve 4 refers to a central axis of an injected fuel mist form (fuel spray pattern). For example, in a case where injection holes 410 (FIG. 4) for injecting fuel are arranged one after another along an imaginary circle to form a hollow conical fuel mist (a hollow conical fuel spray pattern) upon injection of the fuel, a central axis of the cone shape of the hollow conical fuel mist serves as the injection axis. Alternatively, in a case where the injection holes 410 are arranged one after another along an imaginary straight line to form a fan shaped fuel mist (a fan shaped fuel spray pattern) upon injection of the fuel, a central axis of the fan shape of the fan shaped fuel mist serves as the injection axis. Furthermore, in the present embodiment, the injection axis A of the fuel injection valve 4 is set to coincide with a central axis a of the fuel injection valve 4. However, in some cases, the injection axis of the fuel injection valve 4 may be displaced from the central axis a of the fuel injection valve 4 to meet a certain demand.

Figure 2:
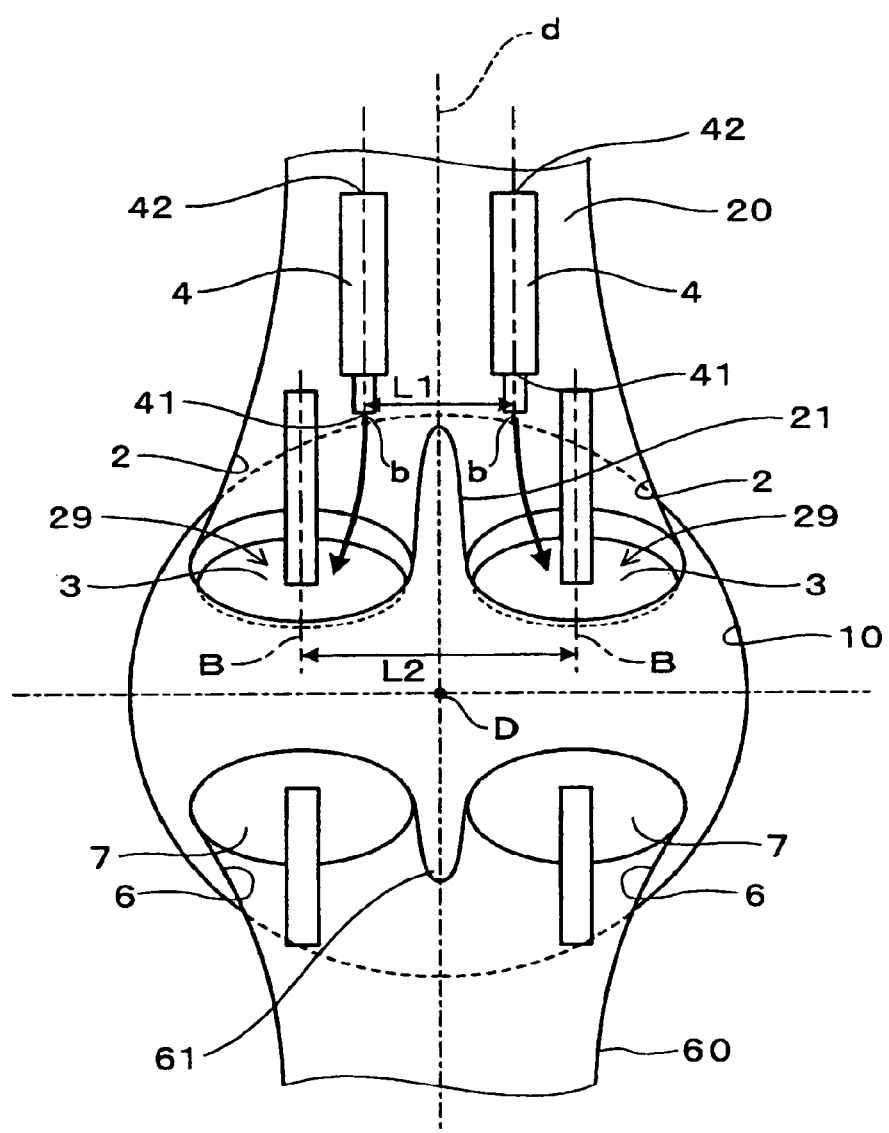
FIG. 2 is a schematic view showing locations of components, such as intake ports, seen from an axial direction according to the embodiment.

The above construction will now be described further in detail. As shown in FIGS. 1 and 2, the internal combustion engine 1 of the present embodiment includes two intake ports 2, to each of which a corresponding one of the intake valves 3 and a corresponding one of the fuel injection valves 4 are provided. As shown in FIG. 2, the two intake ports 2 are branched from an intake passage, which is defined by one intake pipe 20 located on an upstream side thereof, and are partitioned by an inner partition wall 21 to have a generally Y-shape configuration. Each intake port 2 is directed toward the combustion chamber 11 in a direction that is tilted relative to the axial direction of the cylinder 10 and has the curved portion 25, which is curved from a location adjacent to a stem (a shaft) 31 of the intake valve 3 to the opening 29 to guide the air flow in the direction that is close to the axial direction of the cylinder 10.

Also, as shown in FIGS. 1 and 2, the internal combustion engine 1 further includes two exhaust ports 6 and two exhaust valves 7. The exhaust valves 7 are driven to open and close the exhaust ports 6, respectively. The two exhaust ports 6 are branched from an exhaust passage, which is defined by one exhaust pipe 60 located on a downstream side thereof, and are partitioned by an inner partition wall 61 to have a generally Y-shape configuration.

Furthermore, the piston 13 is slidably received in the cylinder 10 such that the piston 13 reciprocates in response to combustion of fuel in the combustion chamber 11.

Each fuel injection valve 4, which is provided to correspond with the corresponding intake port 2, is placed such that a distal end portion 41 having the injection holes 410 (FIG. 4) for injecting fuel projects into the intake port 2 while an opposite rear end portion 42 projects outside of the cylinder head. Each fuel injection valve 4 receives fuel from the rear end portion 42, which is connected to a fuel rail.

Figure 3:
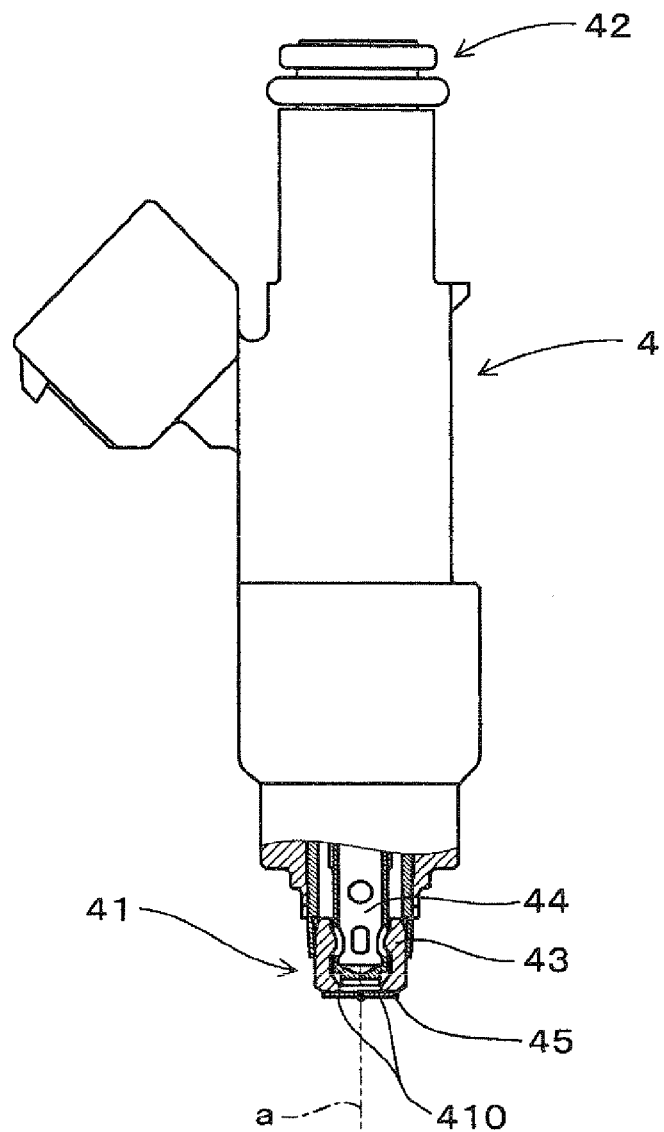
FIG. 3 is a partially fragmented lateral view of the fuel injection valve according to the embodiment.
Figure 4:
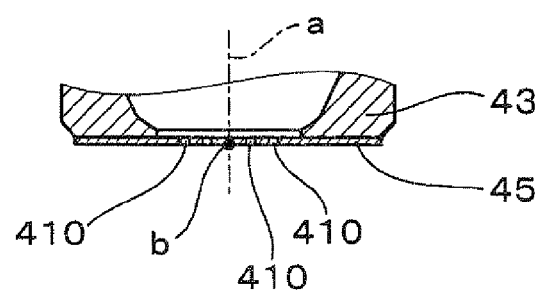
FIG. 4 is a partial enlarged cross sectional view showing a structure of a distal end portion of the fuel injection valve according to the embodiment.

As shown in FIGS. 3 and 4, the fuel injection valve 4 has a needle 44, which is axially reciprocally received in a body 43. When the needle 44 is lifted from a valve seat, which is formed in the body 43, fuel is injected through the injection holes 410. Then, when the needle 44 is seated against the valve seat, the injection of fuel through the injection holes 410 is stopped. That is, the injection of fuel takes place intermittently through the forward movement and the backward movement of the needle 44.

The distal end portion 41 of the fuel injection valve 4 includes an injection hole plate 45, which has the injection holes 410, at a distal end of the body 43. In the present embodiment, the direction of the injection axis of the fuel injection valve 4 coincides with the axial direction of the fuel injection valve 4 (a reciprocating direction of the needle 44 in the present embodiment) and extends along the central axis a of the fuel injection valve 4. Furthermore, in the present instance, a distal end center point b of the fuel injection valve 4 is an intersecting point, at which the central axis a of the fuel injection valve 4 intersects with a distal end surface of the injection hole plate 45. The structure of the fuel injection valve 4 is not limited to the above described one. For example, in place of the above described fuel injection valve 4, it is possible to use a fuel injection valve having a distal end portion structure shown in any one of FIGS. 5 to 9 (described later in greater detail).

FIG. 1 shows the descriptive diagram, in which the imaginary plane that includes the central axis C of the one of the intake ports 2 lies in the plane of the sheet of FIG. 1. As shown in FIG. 1, the central axis C of the intake port 2 extends from the upstream side to the opening of the combustion chamber 11 along a generally linear constant portion (generally straight portion) 24 and the curved portion (arcuately curved portion) 25.

FIG. 1 indicates the state where the injection axis A of the fuel injection valve 4 is seen through the imaginary plane (the plane of the sheet of FIG. 1) or is viewed in the direction perpendicular to the imaginary plane. In the present embodiment, the intersecting point P, at which the injection axis A of the fuel injection valve 4 intersects with the surface of the intake valve 3 placed in the close position for closing the opening 29, is located on the surface (the top surface in FIG. 1) of the valve head 32 and is placed outward of the central axis B of the intake valve 3 in the radial direction of the cylinder 10 in FIG. 1. The injection axis A does not contact the inner wall surface of the intake port 2 all the way to the point where the injection axis A intersects with the surface of the intake valve 3. Furthermore, the injection axis A of the fuel injection valve 4 and the central axis B of the intake valve 3 do not merge with each other on an upstream side of an imaginary valve seat plane, in which the valve seat 29a of the opening 29 of the intake port 2 resides, when the fuel injection valve 4, the intake valve 3, the intake port 2 and the cylinder 10 are viewed from the direction, which is perpendicular to the imaginary plane (the plane of the sheet of FIG. 1).

In FIG. 1, the central axis C of the intake port 2 intersects with the injection axis A. However, in a three dimensional view, the central axis C of the intake port 2 does not intersect with the injection axis A and is slightly deviated from the injection axis A. More specifically, the injection axis A is slightly deviated toward a center location between the two intake ports 2. The above relationship will be clearly understood when it is indicated on the above imaginary plane.

Furthermore, in the present embodiment, as shown in FIG. 2, the number of the intake ports 2 is set to two. A distance L1 between the distal end center point b of the one fuel injection valve 4 and the distal end center point b of the other fuel injection valve 4 is set to be smaller than a distance L2 between a center point of the opening 29 of the one intake port 2 and a center point of the opening 29 of the other intake port 2 (or between the central axis B of the one intake valve 3 and the central axis B of the other intake valve 3).

Furthermore, as shown in FIG. 2, the two fuel injection valves 4 are symmetrically arranged about the center plane d, which includes the central axis D of the cylinder 10 and equally divides the two intake ports 2 on its left and right sides in FIG. 2 as viewed in the axial direction of the cylinder 10 (the two intake ports 2 being symmetrically arranged about the center plane d). Furthermore, as shown in FIG. 2, the two fuel injection valves 4 are placed generally parallel to each other.

In the internal combustion engine 1, at the time of supplying fuel into the combustion chamber 11, the intake valve 3 is moved forward to open the opening 29 of the intake port 2, and the fuel is injected from the fuel injection valve 4. Thereby, the air and fuel are supplied into the combustion chamber 11.

In the case of the present embodiment where the multiple fuel injection valves (multiple fuel injectors) are provided, the fuel, which is injected from each fuel injection valve 4, may possibly tend to adhere to the radially outer side inner wall surface (the concavely curved inner peripheral wall surface that may be curved along an imaginary arc) 255, which is located on the downstream side of the central axis B of the intake valve 3 at the radially outer side of the curved portion 25 in the bending direction, i.e., which is most distant from the center of the curvature of the curved portion 25.

In the present instance, the fuel injection valve 4 is placed such that the intersecting point P, at which the injection axis A intersects with the surface of the intake valve 3, is located outward of the central axis B of the intake valve 3 in the radial direction of the cylinder 10 in FIG. 1. In this way, a resultant vector, which is a sum of a fuel mist velocity vector and an air velocity vector, is directed toward the cylinder 10, i.e., is directed toward the center of the opening of the combustion chamber 11. Thus, the fuel mist does not likely flow toward the radially outer side inner wall surface 255, which is the upper inner wall surface of the intake port 2, to reduce or limit the adhesion of the fuel to the radially outer side inner wall surface 255.

Furthermore, in the present embodiment, as discussed above, the number of the intake ports 2 is set to two. Also, the distance L1 between the distal end center point b of the one fuel injection valve 4 and the distal end center point b of the other fuel injection valve 4 is set to be smaller than the distance L2 between the center point of the opening 29 of the one intake port 2 and the center point of the opening 29 of the other intake port 2. Furthermore, the two fuel injection valves 4 are placed in an area between the center point of the opening 29 of the one intake port 2 and the center point of the opening 29 of the other intake port 2. In this way, the fuel is concentrated toward the inner side between the two intake ports 2. Therefore, when the fuel flows into the combustion chamber 11, it is possible to limit adhesion of the fuel to the inner wall of the cylinder 10, which defines the combustion chamber 11, and thereby possible to limit exhaustion of such adhered fuel as unburnt fuel. Therefore, it is possible to further reduce the content of the hydrocarbons in the exhaust gas.

Furthermore, the two fuel injection valves 4 are symmetrically arranged about the center plane d on the left side and the right side of the center plane d in FIG. 2. In this way, it is possible to simplify the structure of the cylinder head, in which the installation holes for installing the fuel injection valves 4 are formed, and also it is possible to ease the installation work of the fuel injection valves 4 to the cylinder head.

As discussed above, the structure of the distal end portion of the fuel injection valve 4 may be modified to the structure shown in any one of FIGS. 5 to 9.

Figure 5:
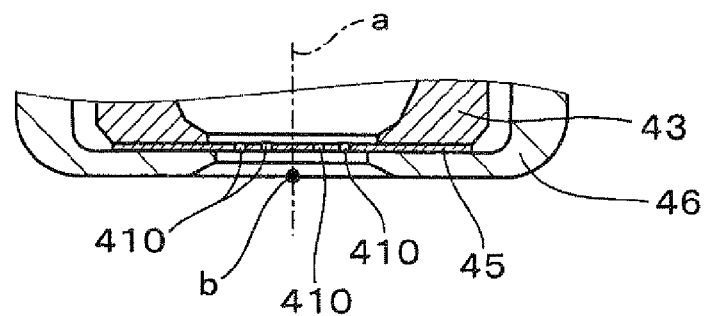
FIG. 5 is a partial enlarged cross sectional view showing a structure of a distal end portion of a modification of the fuel injection valve according to the embodiment.

In the case of the fuel injection valve shown in FIG. 5, a sleeve 46 is provided to cover the outer side of the injection hole plate 45, which is placed at the distal end of the body 43. In this case, the distal end center point b of the fuel injection valve is an intersecting point, at which the central axis a of the fuel injection valve (the injection axis A) intersects with a plane that includes a distal end surface of the sleeve 46.

Figure 6:
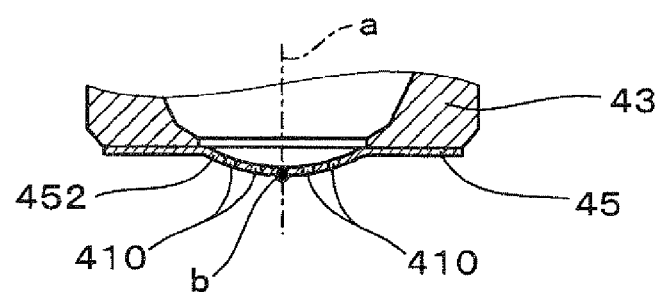
FIG. 6 is a partial enlarged cross sectional view showing a structure of a distal end portion of another modification of the fuel injection valve according to the embodiment.

In the case of the fuel injection valve shown in FIG. 6, a portion of the injection hole plate 45 forms a protruding portion 452, which is convexly curved toward the distal side (the injection direction). In this case, the distal end center point b of the fuel injection valve is an intersecting point, at which the central axis a of the fuel injection valve (the injection axis A) intersects with a distal end surface of the protruding portion 452.

Figure 7:
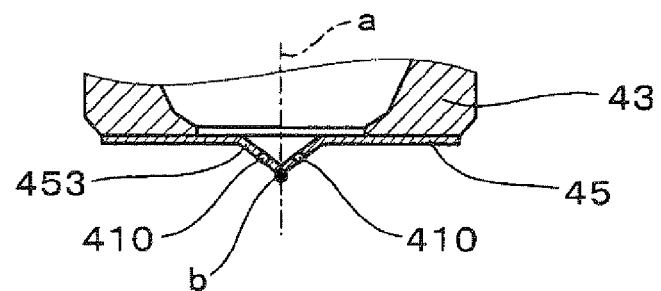
FIG. 7 is a partial enlarged cross sectional view showing a structure of a distal end portion of a further modification of the fuel injection valve according to the embodiment.

In the case of the fuel injection valve shown in FIG. 7, a portion of the injection hole plate 45 forms a protruding portion 453, which conically protrudes toward the distal side (the injection direction). In this case, the distal end center point b of the fuel injection valve is an intersecting point, at which the central axis a of the fuel injection valve (the injection axis A) intersects with a distal end surface of the protruding portion 453.

Figure 8:
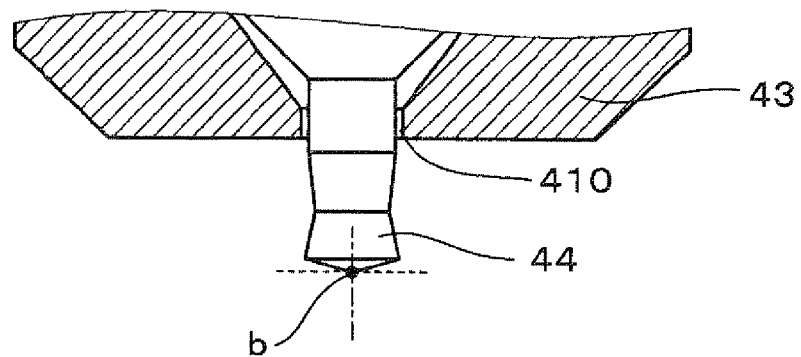
FIG. 8 is a partial enlarged cross sectional view showing a structure of a distal end portion of a further modification of the fuel injection valve according to the embodiment.

In the case of the fuel injection valve shown in FIG. 8, the needle 44 protrudes from the body 43. In this case, the distal end center point b of the fuel injection valve is a distal end point of the needle 44 along the central axis a of the fuel injection valve (the injection axis A).

Figure 9:
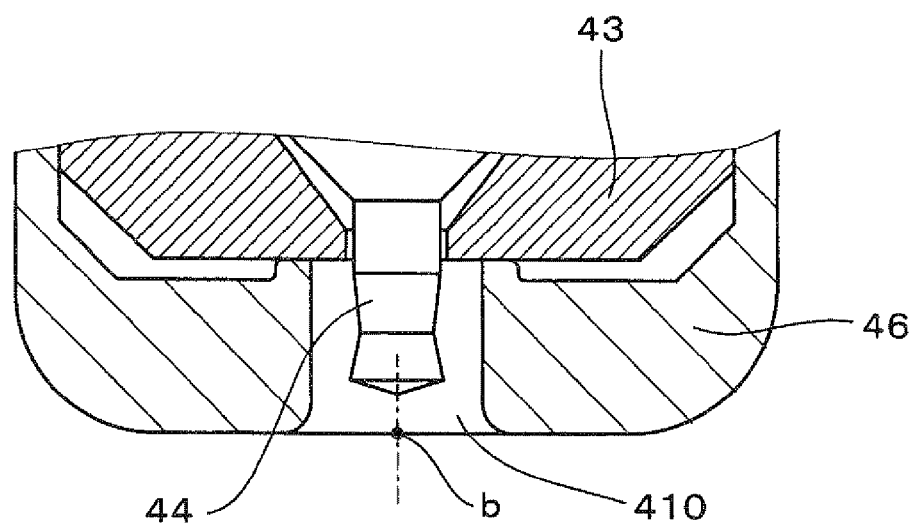
FIG. 9 is a partial enlarged cross sectional view showing a structure of a distal end portion of a further modification of the fuel injection valve according to the embodiment.

In the case of the fuel injection valve shown in FIG. 9, the needle 44 protrudes from the body 43, and the sleeve 46 covers the outer side of the needle 44. In this case, the distal end center point b of the fuel injection valve is an intersecting point, at which the central axis a of the fuel injection valve (the injection axis A) intersects with a plane that includes a distal end surface of the sleeve 46.

In the case where the multiple fuel injection valves are provided to the multiple intake ports, respectively, it is possible to reduce the injection quantity of fuel per injection valve in comparison to the prior art case where the fuel is injected from the single fuel injection valve located on the upstream side of the branching point where the intake ports are branched. Thereby, the atomization of the fuel mist can be promoted in comparison to the prior art case.

When the atomization of the fuel mist is promoted in the above manner, the diameter of each atomized fuel mist particle is reduced to have a smaller mass and thereby to have a smaller kinetic momentum. Therefore, the flow of the fuel mist is significantly influenced by the air flow in the intake port, so that the fuel mist can be more easily carried by the air flow in comparison to the prior art case using the single fuel injection valve. As a result, the quantity of fuel mist, which flows along the upper inner wall surface (the inner wall surface on the side where the fuel injection valve is provided), is increased. Furthermore, the intake port is bent to have the curved portion and is communicated with the combustion chamber through the curved portion. At this curved portion, the air flow is also bent and is curved, so that the outwardly urging force (centrifugal force), which is exerted radially outwardly with respect to the curvature of the curved portion, is applied to the fuel mist, which is carried by the air flow. Therefore, the fuel mist may tend to adhere to the inner peripheral wall surface (concavely curved inner peripheral wall surface, i.e., the radially outer side inner wall surface) of the curved portion, which is located at the radially outer side of the curved portion in the bending direction, i.e., which is most distant from the center of the curvature of the curved portion. At that time, when a radius of curvature of the radially outer side inner wall surface is reduced, the centrifugal force is increased to cause an increase in the amount of adhesion of the fuel mist to the radially outer side inner wall surface.

Therefore, it is desirable to increase the radius of curvature of the radially outer side inner wall surface of the curved portion. However, in some cases, it is difficult to increase the radius of curvature due to some design limitations. In the above embodiment, the injection axis of each fuel injection valve intersects with the surface of the corresponding intake valve placed in the close position at the intersecting point that is located on the upstream side of the central axis of the corresponding intake valve, and the curved portion of each intake port includes the concavely curved inner peripheral wall surface, which is located on the downstream side of the central axis of the corresponding intake valve. In this way, the resultant vector, which is the sum of the fuel mist flow velocity vector and the air flow velocity vector, is directed toward the cylinder, i.e., is directed toward the center of the opening of the combustion chamber. As a result, the flow of the fuel mist toward the upper inner wall surface of the intake port is limited, so that the adhesion of the fuel to the upper inner wall surface can be advantageously reduced to reduce the amount of unburnt hydrocarbons (HCs) exhausted from the internal combustion engine.

Additional advantages and modifications will readily occur to those skilled in the art. The invention in its broader terms is therefore not limited to the above specific details.

What is claimed is:

1. An internal combustion engine comprising:
    a cylinder that receives a piston and defines a combustion chamber;
    a plurality of intake ports, each of which conducts intake air and has:
        an opening that opens to the combustion chamber and defines a valve seat; and
        a curved portion that is located adjacent to the opening on an upstream side of the opening;
    a plurality of intake valves, each of which is provided to a corresponding one of the plurality of intake ports, wherein each intake valve is seatable against the valve seat of the opening to close the opening in a close position thereof and is liftable from the valve seat of the opening to open the opening in an open position thereof; and
    a plurality of fuel injection valves, each of which is provided to a corresponding one of the plurality of intake ports to inject and thereby to supply fuel into the combustion chamber along the intake air through the curved portion and the opening of the corresponding intake port, wherein:
    an injection axis of each fuel injection valve intersects with a surface of the corresponding intake valve placed in the close position at an intersecting point, which is radially outward of a central axis of the corresponding intake valve and radially inward of an inner peripheral wall surface of the corresponding intake port in a radial direction of the opening of the corresponding intake port and is located on an upstream side, with respect to a flow direction of intake air in the corresponding intake port, of the central axis of the corresponding intake valve; and
    the curved portion of each intake port includes a concavely curved inner peripheral wall surface, which is located on a downstream side of the central axis of the corresponding intake valve.

2. The internal combustion engine according to claim 1, wherein when each fuel injection valve, the corresponding intake valve, the corresponding intake port and the cylinder are viewed from a direction, which is perpendicular to an imaginary plane that includes a central axis of the intake port and is also parallel to the a central axis of the cylinder, the intersecting point is located outward of the central axis of the intake valve in a radial direction of the cylinder.

3. The internal combustion engine according claim 1, wherein the injection axis of each fuel injection valve and the central axis of the corresponding intake valve do not merge with each other on an upstream side of an imaginary valve seat plane, in which the valve seat of the opening of the corresponding intake port resides, when each fuel injection valve, the corresponding intake valve, the corresponding intake port and the cylinder are viewed from the direction, which is perpendicular to the imaginary plane.

4. The internal combustion engine according to claim 1, wherein:
    the plurality of intake ports includes first and second intake ports;
    the plurality of intake valves includes first and second intake valves;
    the plurality of fuel injection valves includes first and second fuel injection valves; and
    a distance between a distal end center point of the first fuel injection valve and a distal end center point of the second fuel injection valve is set to be smaller than a distance between the central axis of the first intake valve and the central axis of the second intake valve.

5. The internal combustion engine according to claim 4, wherein the first and second fuel injection valves are symmetrically arranged about a center plane, which includes a central axis of the cylinder, and about which the first and second intake ports are symmetrically arranged.

6. The internal combustion engine according to claim 4 wherein the first and second fuel injection valves are placed generally parallel to each other.

7. The internal combustion engine according claim 1, wherein the injection axis of each fuel injection valve coincides with a central axis of the fuel injection valve.

8. The internal combustion engine according claim 1, wherein the intersecting point is located on a valve head of the intake valve at a location radially outward of a stem of the intake valve.

9. The internal combustion engine according claim 1, wherein the concavely curved inner peripheral wall surface is curved along an imaginary arc.

10. The internal combustion engine according claim 1, wherein the plurality of fuel injection valves are provided to the plurality of intake ports, respectively, so that each of the plurality of intake ports is provided with only the corresponding one of the plurality of fuel injection valves.

11. The internal combustion engine according claim 1, wherein an amount of the fuel, which is injected from each fuel injection valve on the upstream side of the central axis of the corresponding intake valve, is larger than an amount of the fuel, which is injected from each fuel injection valve on a downstream side of the central axis of the corresponding intake valve.

12. The internal combustion engine according claim 1, wherein the injection axis of each fuel injection valve and the central axis of the corresponding intake valve do not intersect with each other along an entire length of the corresponding intake valve in both of the close position and the open position of the corresponding intake valve.

* * * * *